United States Patent [19]

Larson et al.

[11] Patent Number: 4,859,867
[45] Date of Patent: Aug. 22, 1989

[54] WINDSHIELD MOISTURE SENSING CONTROL CIRCUIT

[75] Inventors: Mark L. Larson, Grand Haven; Karl H. Hanft; Desmond J. O'Farrell, both of Holland, all of Mich.

[73] Assignee: Donnelly Corporation, Holland, Mich.

[21] Appl. No.: 183,693

[22] Filed: Apr. 19, 1988

[51] Int. Cl.$^4$ .......................... H02J 1/00; H02P 1/04
[52] U.S. Cl. ................................. 307/10.1; 318/444; 318/480; 318/DIG. 2; 15/250 C
[58] Field of Search ............... 307/10 R, 9, 117, 118; 318/443, 444, 480, 483, DIG. 2; 15/250 C, 250.12

[56] References Cited

U.S. PATENT DOCUMENTS

| | | | |
|---|---|---|---|
| 3,555,289 | 1/1971 | Sobkow | 307/10 R |
| 3,649,898 | 3/1972 | Inoue | 318/483 |
| 3,743,056 | 7/1973 | Zitelli et al. | 318/480 X |
| 3,786,330 | 1/1974 | Inoue et al. | 318/483 |
| 3,794,847 | 2/1974 | Cadiou | 307/117 |
| 4,131,834 | 12/1978 | Blaszkowski | 318/483 |
| 4,317,073 | 2/1982 | Blaszkowski | 318/483 |
| 4,339,698 | 7/1982 | Kearns | 318/444 |
| 4,355,271 | 10/1982 | Noack | 318/480 |
| 4,463,294 | 7/1984 | Gibson | 318/443 X |
| 4,476,419 | 10/1984 | Fukatsu et al. | 318/444 |
| 4,481,450 | 11/1984 | Watanabe et al. | 318/444 |
| 4,495,452 | 1/1985 | Boegh-Peterson | 318/444 |
| 4,542,325 | 9/1985 | Kobayashi et al. | 318/483 |
| 4,554,493 | 11/1985 | Armstrong | 318/444 |
| 4,595,866 | 6/1986 | Fukatsu et al. | 318/444 |
| 4,620,141 | 10/1986 | McCumber et al. | 318/483 |
| 4,636,643 | 1/1987 | Nakamura et al. | 250/338 |
| 4,636,698 | 1/1987 | Leclercq | 318/443 |
| 4,689,536 | 8/1987 | Iyoda | 318/483 |
| 4,798,956 | 1/1989 | Hochstein | 250/341 |

FOREIGN PATENT DOCUMENTS

| | | |
|---|---|---|
| 175362 | 3/1986 | European Pat. Off. |
| 2101319 | 7/1972 | Fed. Rep. of Germany. |
| 2741653 | 3/1979 | Fed. Rep. of Germany ...... 318/483 |
| 3206029 | 4/1983 | Fed. Rep. of Germany .... 15/250 C |
| 3244767 | 6/1984 | Fed. Rep. of Germany .... 15/250 C |
| 54-110529 | 8/1979 | Japan ................................. 15/250 C |
| 58-118436 | 7/1983 | Japan. |
| 59-14563 | 1/1984 | Japan ................................. 15/250 C |
| 59-100034 | 6/1984 | Japan ................................. 15/250 C |
| 60-78844 | 5/1985 | Japan ................................. 15/250 C |
| 1101441 | 1/1968 | United Kingdom. |
| 1150384 | 4/1969 | United Kingdom ............. 15/250.12 |
| 1321221 | 1/1973 | United Kingdom ............. 15/250 C |
| 1382261 | 1/1975 | United Kingdom ......... 318/DIG. 2 |

OTHER PUBLICATIONS

Pp. 328, 532, 533 and 534 from Siemen Opto Electronic Data Book, 1986.

Primary Examiner—William M. Shoop, Jr.
Assistant Examiner—Sharon D. Logan
Attorney, Agent, or Firm—Price, Heneveld, Cooper, DeWitt & Litton

[57] ABSTRACT

The specification discloses a modulated optical moisture sensor control circuit for a vehicle windshield wiper. The control system includes a first detector providing a signal indicative of moisture on the windshield and a second detector providing a reference signal indicative of system variables, such as ambient light. The control system includes improved circuitry for separating the steady-state portion of each detector signal due to ambient light from the modulated infrared IR signal. The system further includes a sensitivity adjustment accessible by the vehicle operator to alter the sensitivity of the circuit to at least one of the two variable detector signals. Additionally, the control system cooperates with a conventional off/intermittent/on wiper switch so that the wiper is responsive to the moisture sensor only when the conventional switch is in the intermittent position and a second manually actuated switch indicates preferred operation in the moisture sensor mode.

17 Claims, 4 Drawing Sheets

WINDSHIELD MOISTURE SENSING CONTROL CIRCUIT

BACKGROUND OF THE INVENTION

The present invention relates to moisture detectors for automotive vehicle windshields, and more particularly to control systems incorporating such sensors to operate vehicle accessories such as windshield wipers.

A wide variety of windshield moisture sensors have been developed for controlling the actuation of an automotive vehicle windshield wiper and/or washer. Generally speaking, the sensors are of three types—optical, capacitive, or resistive. In optical systems, a light beam is directed into the windshield at an angle; and the refracted/reflected portion of the beam is monitored to evaluate whether moisture is present In capacitive sensors, two electrodes are mounted on the windshield surface; and the capacitance between the electrodes is monitored to determine the presence of moisture. In resistive systems, the resistance encountered by the wiper motor in driving the wipers across the windshield is monitored; and the wipers are stopped when the resistance reaches a preselected drag level indicating that the windshield is dry.

The present invention relates to optical technology, which suffers at least three significant disadvantages. First, the optical detectors in such systems are rather sensitive to ambient light which often contains a large amount of infrared light. Headlights, taillights, commercial signs, and other filament-type light bulbs are significant sources of IR light. Not infrequently, ambient light saturates the control system and/or reduces the amplitude of the modulated useable IR control signal, triggering "false wipes" and/or making detection of the modulated infrared signal nearly impossible. An example of such a system is illustrated in U.S. patent application Ser. No. 073,496, filed July 15, 1987, by Hochstein, and entitled ELECTRO-OPTICAL WINDSHIELD MOISTURE SENSING NOW U.S. Pat. No. 4,798,956.

A second problem is that the fixed reference signal, even when user-selectable, used in such systems provides inadequate performance required by present day commercial applications. As noted above, the infrared portion of ambient light can trigger "false wipes". Further, the system components degrade with age and the performance varies with temperature and thereby results in a system where false wipes are continuous or no wipes will occur even when moisture is on the windshield. Examples of such systems are illustrated in U.S. Pat. No. 4,481,450 issued Nov. 6, 1984 to Watanabe et al entitled SYSTEM FOR CONTROLLING A VEHICLE WINDOW AND THE LIKE. Although the fixed reference signal can be altered, such systems are still subject to the variables of ambient light, temperature, and subsequent component degradation.

A third problem occurs concerning the interface of the conventional wiper control switch and the rain sensor control. For example, in a first type of interface, the system is switchable between rain-sensor control and conventional control regardless of the conventional control setting. Such a system is illustrated in British Patent No. 1,101,441 issued Jan. 31, 1968 to Kempston Electrical Co., Ltd. and entitled IMPROVEMENTS IN WINDSCREEN WIPERS. This prohibits continuous operation of the wipers when the system has been switched to the rain-sensor mode. In a second type of interface, the conventional switch is modified to replace the "intermittent" mode with a "rain sensor" mode so that rain-sensor control is always substituted for the intermittent mode. Examples of such systems are illustrated in U.S. Pat. Nos. 4,689,536 issued Aug. 25, 1987 to Iyoda entitled APPARATUS AND A METHOD FOR CONTROLLING A WINDSHIELD WIPER; 4,542,325 issued Sept. 17, 1985 to Kobayashi et al entitled RAIN CONDITION DEPENDENT WIPER CONTROL SYSTEM FOR AN AUTOMOTIVE VEHICLE; and 4,317,073 and 4,131,834 issued Feb. 23, 1982 and Dec. 26, 1978, respectively, to Blaszkowski entitled WINDSHIELD WIPER CONTROL SYSTEM. These systems prevent operation of the wipers in the intermittent mode, which is desired by many drivers.

SUMMARY OF THE INVENTION

The aforementioned problems are overcome in the present invention comprising an improved control circuit for an infrared rain sensor providing (1) improved compensation for ambient light, temperature, and other system variables, (2) driver sensitivity adjustment which remains functional regardless of ambient light or other system variables, and (3) an improved control interface with the conventional wiper switch.

In a first aspect of the invention, the system includes a light emitter and two sensors for detecting radiation emitted therefrom. The first detector is responsive to the radiation refracted and reflected by the windshield to provide an indication of the moisture thereon. The second sensor is responsive to radiation received directly from the emitter to provide a reference signal indicative of the emitter output. At least the first detector is also subject to ambient light since it is directed toward the windshield. To reduce the impact of the ambient light on the modulated emitter signal, a control circuit is provided to strip the ambient light signal from the modulated signal received by the detector. More specifically, the signal processor includes a current-to-voltage convertor implemented as an operational amplifier, followed by a filter for removing the D.C. component of the signal, followed by a second amplifier to amplify the modulated signal to a useable range. This unique arrangement of the amplifiers and filter maintains the detected signal within range while still removing the D.C. component due to ambient light. This processing permits improved manipulation of the amplified modulating system to provide a more accurate indication that a wipe is or is not necessary.

In a second aspect of the invention, the rain sensor enables driver adjustment of the sensitivity in conjunction with a floating reference voltage indicative of system variables. The second detector responsive to radiation received directly from the infrared emitter provides a varying reference signal responsive to system variables such as temperature, aging, or component degradation. The selectivity capability is implemented by way of a manually actuated switch accessible by the vehicle operator to alter the impact of at least one of the signals from the first and second detectors to alter the control function implemented by the system. Consequently, the sensitivity of the system to moisture on the windshield can be adjusted by the vehicle operator to meet individual needs or desires, while the system still provides compensation for variables acting on the system, such as temperature, component degradation, component variation, wiper wear, glass pitting, and changes in the optical characteristics of the windshield components.

In a third aspect of the invention, a unique interface is provided between the rain sensor control and the conventional wiper switch. A conventional wiper switch includes at least three separate settings—off, intermittent at selectable time intervals, and continuous at one or more speeds. The present control system further includes a driver-activated switch indicating that rain-sensor control is preferred. The control system overrides the conventional wiper switch to permit rain-sensor control only when the conventional switch is in the intermittent setting. Consequently, driver selection of the continuous operation settings prohibit rain-sensor control. Such a control interface provides enhanced controllability and results which more accurately reflect the desires and needs of the driver in clearing moisture from the windshield.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
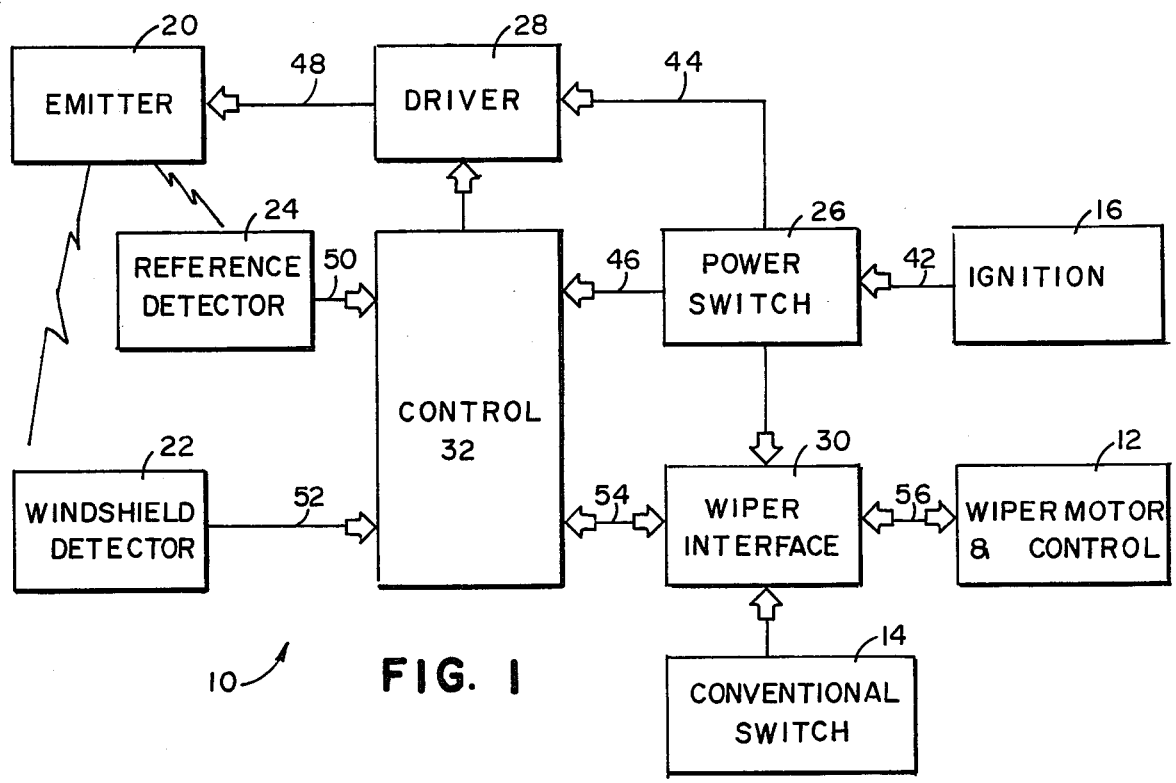
FIG. 1 is a block diagram illustrating the operation of the present rain sensor control system.

A windshield wiper control system constructed in accordance with a preferred aspect of the invention is illustrated in FIG. 1 and generally designated 10. The conventional components of the system 10 include a wiper motor and control 12, a conventional wiper switch 14, and an ignition switch 16. The rain sensor control includes an emitter module 20, a pair of detectors 22 and 24, a power module 26, an emitter driver 28, a wiper interface 30, and a control 32 coordinating operation of the rain sensor components. The wiper interface 30 provides an interface between the rain sensor of the present invention and the conventional wiper motor 12 and the conventional wiper switch 14 to together control operation of the wiper motor.

Figure 2:
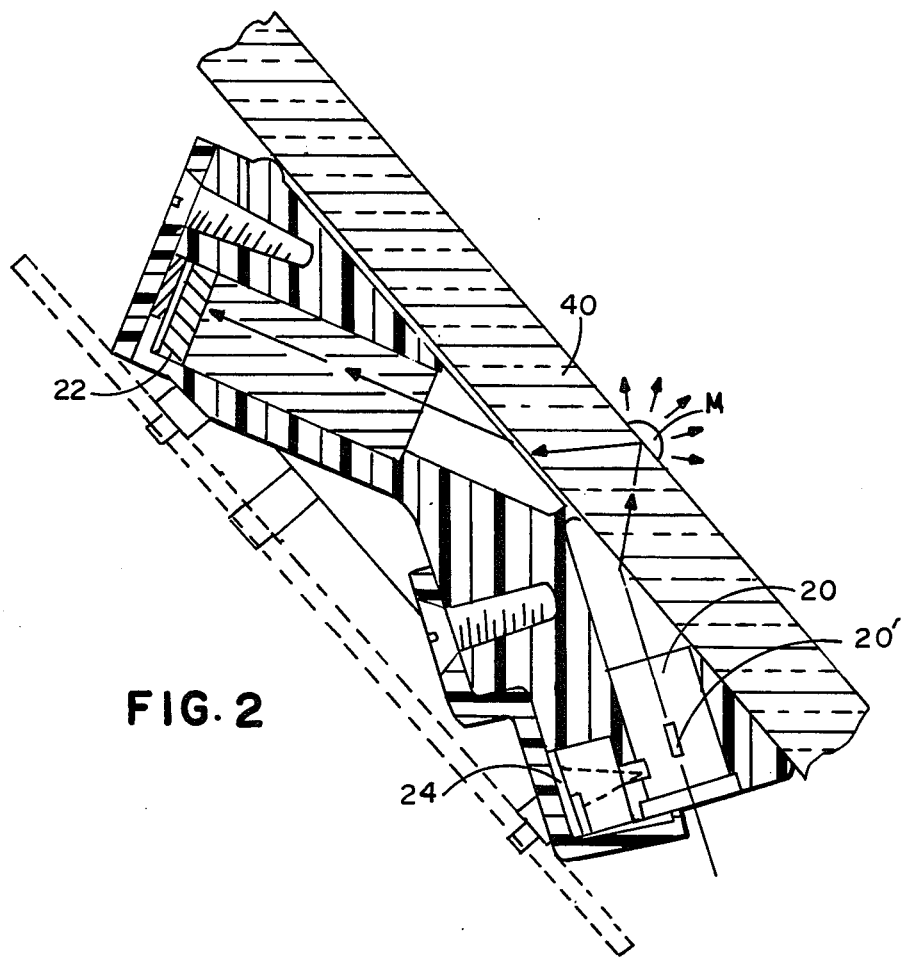
FIG. 2 is a sectional view of the physical emitter/detector configuration of the rain sensor.

The physical configuration and support of the emitter source or module 20 and the detectors 22 and 24 is illustrated in FIG. 2. This physical configuration is more fully described in copending application Ser. No. 183,706 filed on even date herewith by Desmond J. O'Farrell et al, entitled VEHICULAR MOISTURE SENSOR AND MOUNTING APPARATUS THEREFOR, and assigned to the assignee of the present application, the disclosure of which is hereby incorporated by reference. Since the physical configuration of the rain sensor is fully described in said application, such description will not be included in detail herein. Suffice it to say that the emitter 20 emits light or electro-optic radiation. As used in this application, the terms "light" and "electro-optic radiation" refer to that portion of the electromagnetic spectrum from approximately 300 nanometer (nm) to $10^5$ nm. Although this portion of the spectrum is presently preferred, it is anticipated that future developments in electro-optic devices may permit use of additional portions of the spectrum without departing from the spirit of the present invention. Light from the emitter is directed into the windshield 40 at an angle so that the radiation is refracted at the inner surface of the windshield, reflected by the outer surface of the windshield, and rerefracted at the inner surface of the windshield to be directed onto the first detector 22. The reference detector 24 is positioned proximate the light emitting source 20 to receive radiation directly therefrom. Either or both of the sensors 22 and 24 may also be responsive to ambient light as illustrated in the referenced copending application. However, the first detector 22 is at least responsive to radiation refracted and/or reflected by the windshield; and the detector 24 is at least responsive to radiation directly impinging thereon from the emitter. Although the present specification often refers to emitter and detector in the singular, it will be understood that plural emitters and detectors can be used, for example, to create a redundant system.

FIG. 1 illustrates the control circuit for driving the emitter module 20 and processing the signals generated by the detectors 22 and 24. The rain sensor includes a power module 26 which receives a conventional vehicle voltage on line 42 and outputs a voltage on lines 44 and 46 useable by the emitter driver 28 and the control 32. The driver 28 pulses the emitter 20 via the line 48 in a modulating or alternating fashion to provide a signal detectable by the detectors 22 and 24 and distinguishable by control 32 from steady state ambient light conditions. The signals outputted by the detectors 22 and 24 are conveyed on lines 50 and 52, respectively to the control module 32 which issues a wiper motor control signal to the wiper interface 30 on the line 54. Depending upon the setting of the conventional wiper switch 14 and the presence of any control signal on the line 54, the wiper interface 30 will issue a wipe signal as appropriate on the line 56 to the wiper motor 12.

As is generally well known to those having ordinary skill in the art, the conventional wiper switch 14 is a three- or four-position switch including at least three states. A first state indicates that the wipers are to remain off; the second state indicates that the wipers are to be operated intermittently; and the third state indicates that the wipers are to be operated continuously. If the switch 14 is a four-position switch, the wipers can be operated at two different continuous speeds. Additionally, the switch is often moveable within the second state to select the time interval at which the wipers are to be intermittently operated. The switch 14 typically includes an R-C circuit in the intermittent state to provide fixed, but selectable, time intervals at which the wiper motor 12 is to be operated.

The power module 26 includes a switch S1 (see FIG. 3) for powering the rain sensor system. As presently preferred, the switch S1 may be mounted in the vehicle headliner as disclosed and illustrated in the referenced copending application. The switch S1 is located within the passenger compartment to be accessible by the vehicle operator and is manually actuable to provide driver control. As will be described in more detail below, the system is controlled by switches 14 and S1 to control operation of the wiper motor. The conventional switch 14 can be overridden by the switch S1 only when the switch 14 is in the intermittent position. Consequently, the vehicle wipers will be actuated in accordance with the table set forth below:

| Wiper Switch (14) | Rain-Sensor Switch (S1) Off | Rain-Sensor Switch (S1) On |
| --- | --- | --- |
| Off | Off | Off |
| Intermittant | Intermittant | Rain-Sensor |
| On | On | On |

Consequently, the conventional switch 14 controls wiper operation unless it is in the intermittent position and the switch S1 is closed to indicate that rain sensor control is preferred. Alternatively, the rain sensor control of the present invention can be used independently of the conventional wiper switch to provide the sole or primary wiper control.

Figure 3:
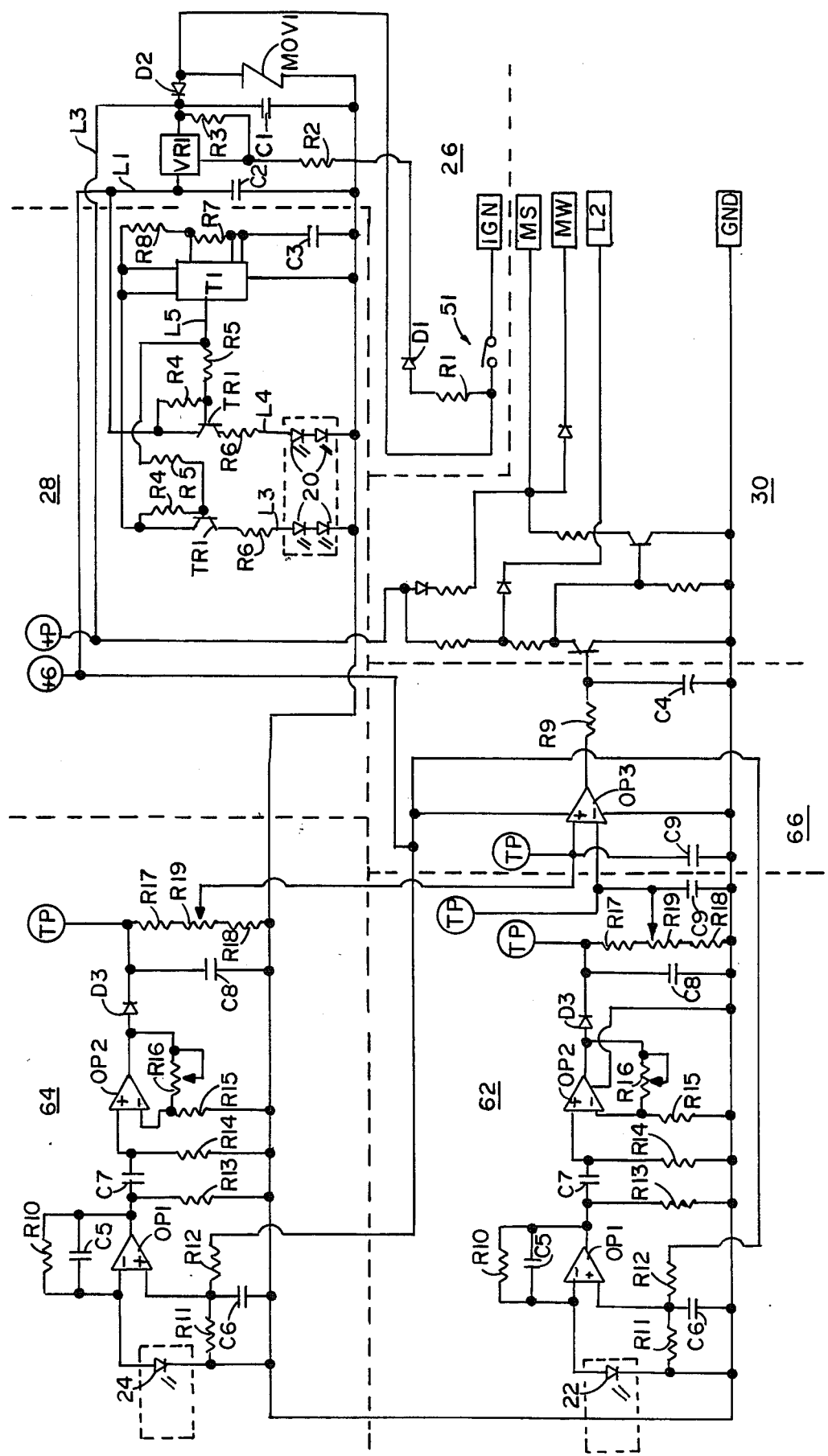
FIG. 3 is a schematic diagram of the control circuit.

The presently preferred circuit implementing the block structure illustrated in FIG. 1 is shown in FIG. 3. The emitters 20 and the detectors 22 and 24 are identified by the same reference numerals in FIG. 3 as in FIG. 1. Similarly, the power unit 26, the driver 28, and the wiper interface 30 are also identified by like numerals. The control unit 32 illustrated in FIG. 1 is shown in greater detail in FIG. 3 and includes the first signal processing circuit 62, the reference signal processing circuit 64, and the comparator circuit 66.

Turning to the power unit 26 (FIG. 3), a switch S1 is provided as previously noted. A resistor R1 and a light emitting diode (LED) D1 are mounted within the switch S to provide an indication that the rain sensor control circuit is actuated. Opening of the switch S1 will turn the system off whereupon the LED1 will no longer be illuminated. The remainder of the power unit 26 includes a positive variable voltage regulator VR1, resistors R2 and R3, diode D2, capacitor C1, and metal oxide varistor (MOV) MOV1 in conventional configuration to provide a presently preferred fixed voltage of six volts on line L1 and a voltage of approximately 13 volts with over-voltage protection on line L3. The capacitor C2 is provided to stabilize the regulator output.

The emitter driver circuit 28 (FIG. 3) includes a pair of channels L3 and L4, each of which powers a pair of the emitters 20 to provide redundant operation. Accordingly, the control can continue to function in a fashion providing rain-sensor-responsive control upon loss of either channel. The rain emitter of the present invention can operate if either of the channels L3 or L4 becomes inoperative for any reason. Each of the channels L3 and L4 includes a conventional drive configuration of transistor TR1 and resistors R4, R5, and R6 which is responsive to a pulse signal on line L5 to pulse the emitters. The presently preferred frequency of the control signal is one kilohertz (kHz); and the preferred pulse width is fifteen microseconds (microsec). The LED's are pulsed to provide a modulated signal distinguishable from steady-state signals, such as those due to ambient light. The short pulse width is desired to increase the useable output and thereby provide a more easily detectable signal. Further, pulsing of the emitters prolongs their life. Alternate frequencies and duty cycles will become readily apparent to those having ordinary skill in the art depending upon a particular application. The pulse signals on line L5 are provided by a conventional 555 timer T1 which is configured to be astable with capacitor C3 and resistors R7 and R8.

The wiper interface 30 (FIG. 3) has been designed by a third party to interface with a conventional wiper motor control, the internal configuration and operation of which is considered proprietary and maintained in confidence by the third party. The interface definition given Applicants by the third party was to provide (1) a high signal (from the comparator circuit) when moisture is detected and (2) a low signal otherwise. The interface receives power via line L3 and connects to three lines MS, MW, and L2. It is Applicants' understanding that lines MS and MW are a multiplex line to the windshield wiper system; while L2 is a line providing a "ready" signal indicating that the wiper is out of the park position. Applicants disclose the construction of the wiper interface designed by the third party to comply with the "best mode requirement".

As disclosed, the first detector signal-processing circuit 62 and the reference detector signal-processing circuit 64 are generally identical to one another; and consequently only the circuit 62 will be described in detail. It is possible for the processing circuits to differ from one another. The detector 22 is a photodiode whose voltage and consequently current generation vary with the intensity of infrared light impinging thereon. Voltage increases and current increases with increased light; and voltage decreases and current decreases with decreased light. The current is therefore proportional to the light intensity impinging thereon. The amplifier OP1 is configured with resistors R10, R11, R12, and R13 and capacitors C5 and C6 in conventional fashion to perform current-to-voltage conversion and to provide amplification. The amount of amplification is presently in the range of 5 to 30, preferably 20, depending on the windshield used and performance preferred. The degree of amplification will depend on the windshield characteristics and the desired sensitivity to ambient light. The signal outputted by op amp OP1 is filtered by an R-C network including resistor R14 and a capacitor C7 to remove the D.C. component from the signal. The D.C. component is attributable to any steady state source of ambient light including daylight, headlights, taillights, commercial lights, and virtually any other filament-type light source.

Placement of the capacitor C7 between the photodiode 22 and the op amp OP1 has been found to not work particularly well. The capacitor when so located provides a restrictively high input impedance which reduces the amplitude of the modulated signal in high ambient light conditions. Such a reduced amplitude can appear to be a "moisture-present" signal and thereby trigger a false wipe. The presently disclosed location of C7 between op amp OP1 and op amp OP2 eliminates the input impedance problem while still providing an amplification scheme which virtually eliminates saturation of the combined amplifier system under typical operating conditions of a vehicle Specifically, stripping the D.C. signal by way of the R-C circuit prevents the op amp OP2 from saturating while amplifying the modulated signal to a desired useable level.

The second op amp OP2 is configured in conventional fashion with resistor R15, potentiometer (pot) R16 in conventional fashion to provide amplification of the modulating signal received from the capacitor C7. The present amplification is in the range 2 to 10, preferably 5. The amplification provided by the two op amps OP1 and OP2 together is presently in the range 7 to 40, preferably 25. The pot R16 permits tuning to adjust for component variation and is preferably set at the factory during manufacture. The pot R16 is not accessible by the vehicle operator.

The capacitor C8, resistors R17, R18, and R19, and the diode D3 cooperate to store the peak A.C. value to be stored as a D.C. signal on the capacitor. A voltage divider including resistors R17 and R18 and a pot R19 use a fraction or portion of the stored D.C. signal inputted to the comparator OP3. Presently, the voltage divider R17, R18, R19 of the first signal processing circuit 62 is adjustable to provide 30 to 95 percent of the D.C. signal on capacitor C8 to the comparator circuit 66. The voltage divider circuit R17, R18, and R19 of the reference signal processing circuit 64 provides 20 to 35 percent of the D.C. signal on the associated capacitor C8 to the comparator circuit 66

One of the pots R19 in either of the signal processing circuits 62 and 64 is manually actuable and accessible by the vehicle operator. Preferably, the accessible pot R19 is located adjacent the switch S1 in the vehicle headliner as illustrated in the referenced copending application. In the presently preferred embodiment, the pot R19 of the reference signal processing circuit 64 is the manually actuable pot. The pot R19 of the signal processing circuit 62 is reserved for factory tuning during manufacture to provide additional compensation for component variation. It is anticipated that the roles of the pots R19 in the two circuits 62 and 64 could be reversed.

The comparator circuit 66 includes an op amp OP3 receiving its negative input from the first signal processing circuit 62 and its positive input from the reference signal processing circuit 64. Consequently, the output of the op amp OP3 will be high when the signal from the first signal processing circuit 62 is less than the signal received from the reference signal processing circuit 64 indicating a relatively high amount of moisture on the windshield, and will be low when the first signal is greater than the reference signal indicating a relatively low amount of moisture on the windshield. The high or low signal outputted by the op amp OP3 is then used by the wiper interface 30 to issue control signals to the wiper motor as necessary to clear the windshield of moisture. The R-C filter including resistor R9 and capacitor C4 provides filtering for the control signal outputted by the comparator OP3 to reduce toggling of the signal presented to the wiper interface 30 when the difference between the comparator inputs is small.

First Alternate Embodiment

Figure 4:
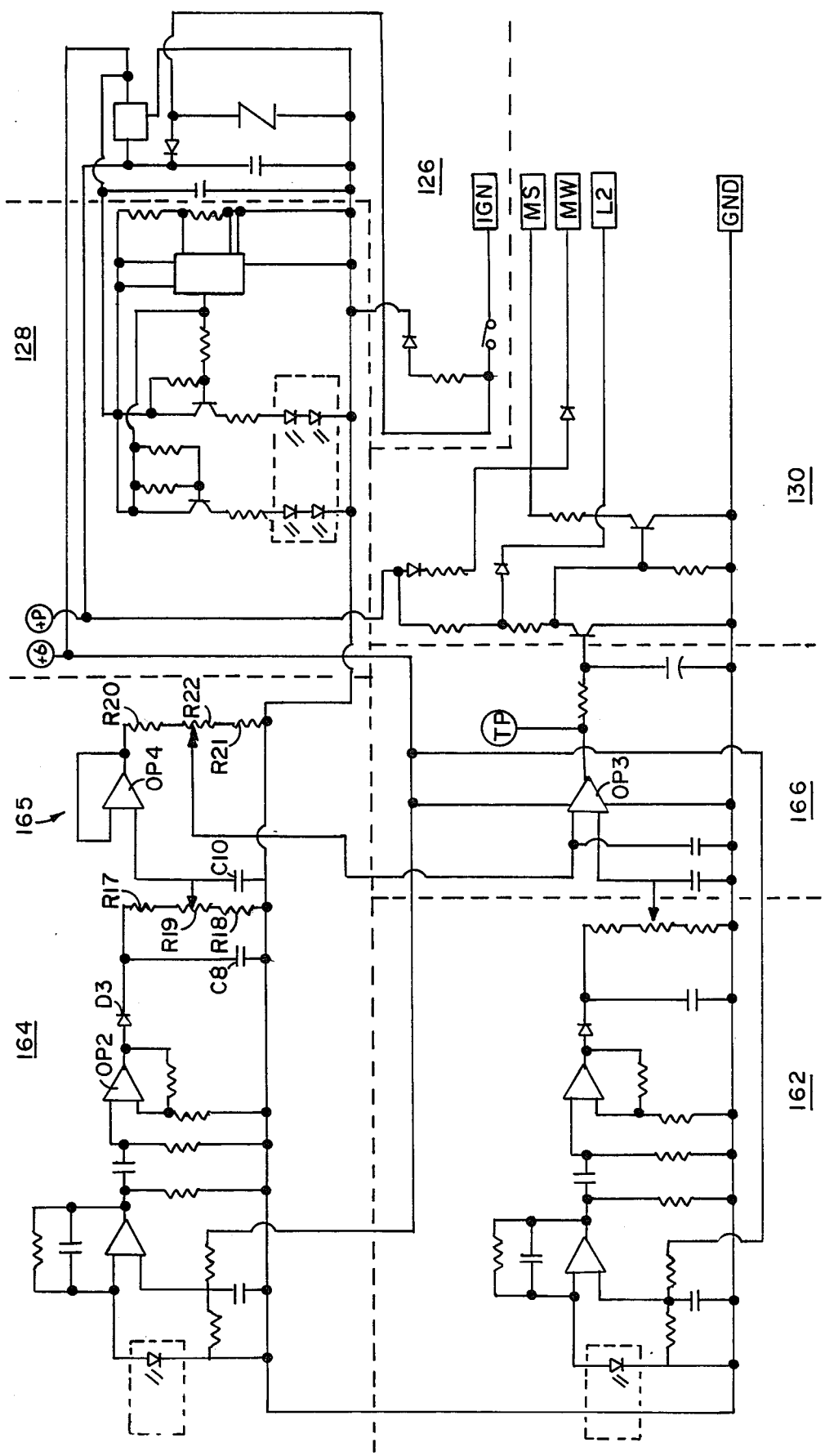
FIG. 4 is a first alternative embodiment of the control circuit.

FIG. 4 discloses a first alternate embodiment of the control circuit illustrated in FIG. 3. The power circuit 126, the driver circuit 128, the interface 130, the first signal processing circuit 162, and the comparator circuit 166 are substantially the same as their counterparts described in conjunction with FIG. 3. The reference signal processing circuit 164 is the only component substantially different in FIG. 4 from the FIG. 3 embodiment. Specifically, an additional voltage follower circuit 165 is interposed between the pot R19 and the comparator circuit 166 to buffer the user selectivity from the A.C. to D.C. filter including C8, R17, R18, R19, and D3.

The op amp OP4 is configured in conventional fashion with the capacitor C10 to comprise a voltage follower circuit for the voltage received from pot R19. A voltage divider circuit comprising resistors R20 and R21 and a pot R22 are included to provide selectability of the percentage of the output of the operational amplifier OP4 to be applied to the comparator circuit 166. In the alternate reference signal processor 164, the pot R22 rather than the pot R19 is the driver selectable pot; and the pot R19 would be used for factory tuning.

Second Alternate Embodiment

Figure 5:
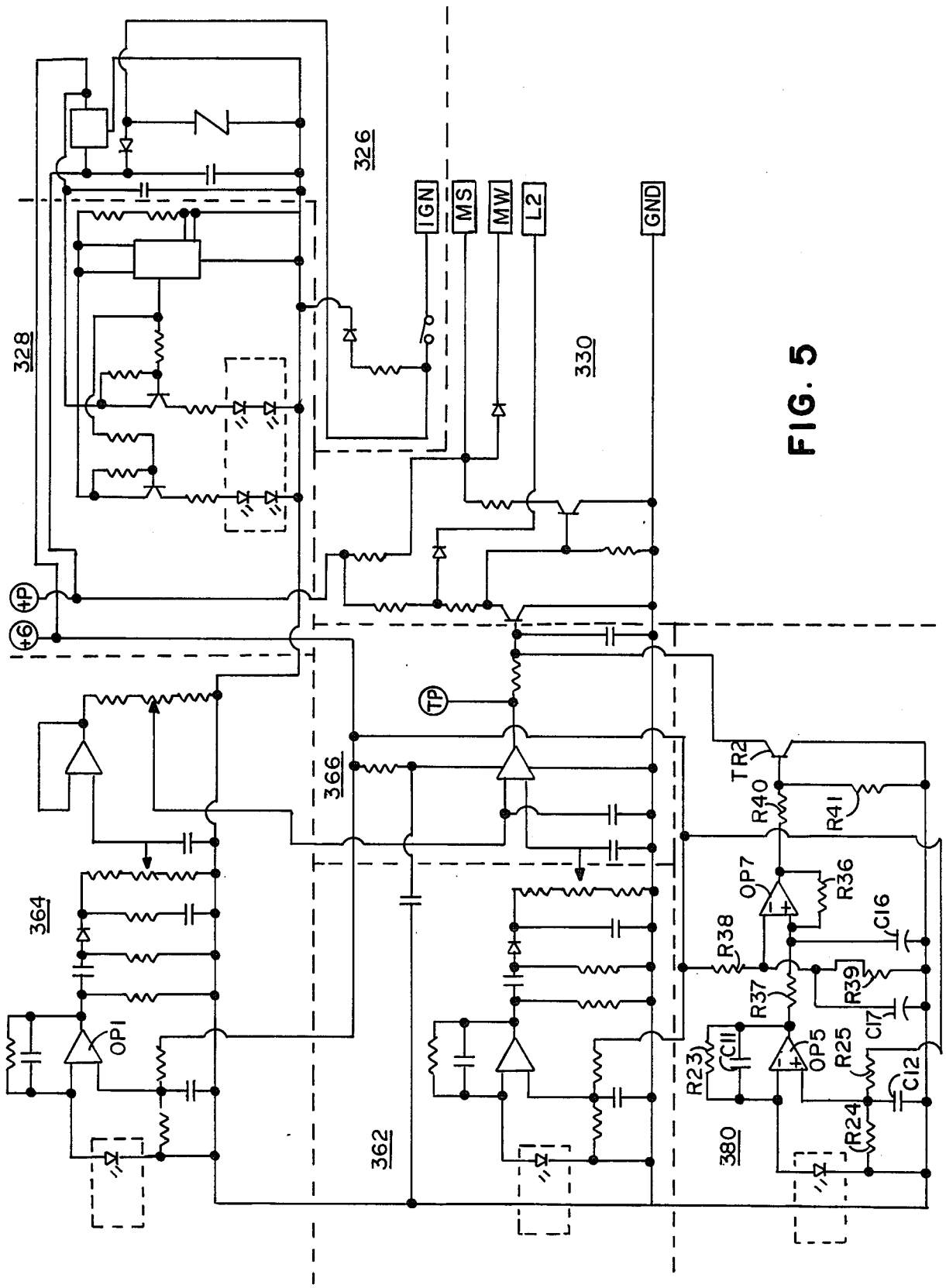
FIG. 5 is a second alternative embodiment of the control circuit.

A second alternate embodiment of the control circuit is illustrated in FIG. 5. The power circuit 326, the emitter driver circuit 328, the wiper interface 330, and the comparator circuit 366 are all substantially the same as their counterparts in the above-described embodiments. The FIG. 5 embodiment compensates for ambient light in a manner rather different, and presently less preferred, than the FIGS. 3 and 4 embodiments. First, all amplification in the circuits 362 and 364 is performed in a single stage to reduce circuitry and cost. Consequently, ambient light will continue to decrease the amplitude of the modulating portion of the detected signal so that false wipe signals can be issued by the comparator circuit 366. To address this potential problem, a third or ambient signal detection circuit is provided to shunt the false wipe control signal in high ambient light conditions, which are presumed by the system to be false wipe conditions as will be described.

The first and reference signal processing circuits 362 and 364 are generally the same as the corresponding circuits in FIG. 4, with the only difference being the removal of op amp OP2 (and its associated components) from both circuits. Consequently, all amplification is provided by op amp OP1.

The ambient light signal processing circuit 380 has an amplifier, a comparator, and a shunting transistor TR2. The amplifier includes an op amp OP5, resistors R23, R24, and R25, and capacitors C11 and C12 configured in conventional fashion. The output of the op amp OP5 is applied to a comparator including op amp OP7, resistors R36 and R37, and a capacitor C16 conventionally configured. The other input to the op amp OP7 comes from the voltage divider network including resistors R38 and R39 and a capacitor C17. The output of the op amp OP7 is high when the ambient light exceeds a preselected level, and the output of the op amp is low when the ambient light is below the preselected level. The output is applied to the base of a transistor TR2 through a voltage divider including resistors R40 and R41.

The transistor TR2 shunts the wiper control signal outputted by the comparator 366 when the ambient light is above a preselected level. The reasoning behind this shunting is that the high ambient light levels occasionally detected are presumed to be a "false wipe" condition. As noted in the background of the invention, high ambient light levels can trigger false wipes since high ambient light levels can exceed the reference voltage or signal and thereby trigger a wipe even when the windshield is dry. The FIG. 6 embodiment presumes that high ambient light levels are possible false wipes and should be stifled by shunting the control signal. Very few conditions should be encountered wherein high ambient light levels are detected when moisture is present on the windshield since it is typically cloudy when rain is falling. Therefore, the FIG. 5 embodiment is commercially acceptable, although not performing as well as the FIGS. 3 and 4 embodiments.

Component Values

The presently preferred values of the circuit components of FIGS. 3, 4, and 5 are as follows:

| Component | Value |
| --- | --- |
| R1 | 1 kohm |
| R2 | 910 ohm |
| R3 | 240 ohm |
| R4 | 100 kohm |
| R5 | 56 ohm |
| R6 | 1.8 ohm |
| R7 | 200 ohm |
| R8 | 15 kohm |
| R9 | 1 kohm |
| R10 | 5.1 kohm |
| R11 | 3.6 kohm |
| R12 | 100 kohm |
| R13 | 6.2 kohm |
| R14 | 22 kohm |
| R15 | 10 kohm |
| R16 | 100 kohm |
| R17 | 4.2 kohm |
| R18 | 13 kohm |
| R19 | 10 kohm |
| R20 | 240 ohm |
| R21 | 1 kohm |
| R22 | 910 ohm |
| R23 | 270 kohm |
| R24 | 5.3 kohm |
| R25 | 100 kohm |
| R36 | 1 Mohm |
| R37 | 1 kohm |
| R38 | 10 kohm |
| R39 | 12 kohm |
| R40 | 10 kohm |
| R41 | 100 kohm |
| C1 | 10 mf |
| C2 | 10 mf |
| C3 | 1 mf |
| C4 | 47 mf |
| C5 | 47 pf |
| C6 | 10 pf |
| C7 | 100 pf |
| C8 | 2 mf |
| C9 | 100 pf |
| C10 | 100 pf |
| C11 | 47 pf |
| C12 | 100 pf |
| C16 | 100 pf |
| C17 | 100 pf |

Other suitable values of components, either alone or in combination with other components, will be readily apparent to those skilled in the art depending upon performance requirements.

Conclusion

The rain sensor control circuit of the present invention results in the production of a more accurate wiper control signal issued to the wiper motor. The unique first and reference signal processing circuits of FIGS. 3 and 4 enable the comparator 66 to be supplied with the modulating signals of interest amplified to a level of increased utility and filtered leaving a useable D.C. signal. The inclusion of an operator-actuated sensitivity adjustment in conjunction with the reference cell signal also enhances operation. Finally, the unique interface between the rain sensor and the conventional wiper switch wherein the conventional wiper switch is overridden by the rain sensor only in the intermittent mode is believed to provide a system of enhanced operability.

Although the present moisture sensor has been described in conjunction with a windshield wiper control system, it will be understood that the moisture sensor can be used in other environments to provide other moisture-responsive control.

The above descriptions are those of preferred embodiments of the invention. Various alterations and changes can be made without departing from the spirit and broader aspects of the invention as defined in the appended claims, which are to be interpreted in accordance with the principles of patent law, including the doctrine of equivalents.

The embodiments of the invention in which an exclusive property or privilege is claimed are defined as follows:

1. A vehicle windshield rain sensor comprising:

emitter means for periodically emitting light radiation;

first sensor means for detecting a portion of the radiation refracted and reflected by a windshield and producing a first signal indicative thereof;

second detector means for detecting a portion of the radiation from said emitter means and producing a second signal indicative thereof;

signal-processing means for processing the first signal, said signal-processing means including first amplifier means for amplifying the first signal, filter means for removing the noncyclical component from the amplified signal, and second amplifier means for amplifying the filtered signal, whereby the noncyclical portion of said signal due to ambient light impinging on said first sensor means is removed from the first signal and the cyclical portion is amplified; and control means for processing the first amplified signal from said signal-processing means and the second signal to provide a decision signal indicative of the amount of moisture on the windshield.

2. A vehicle windshield rain sensor as defined in claim 1 wherein said signal processing means further includes rectifier means for converting the amplified cyclical portion to a noncyclical signal.

3. A moisture-responsive control system comprising:

a detector means for detecting a signal having a modulated portion indicative of the amount of moisture on a transparent panel and an unmodulated portion unrelated to the amount of moisture on the panel, said detector means emitting a first signal indicative of the combined portions;

a signal processor for amplifying and filtering the first signal, said signal processor comprising a pair of amplifier stages and a filtering stage therebetween for removing the unmodulated portion of the signal;

a reference detector means for detecting the unmodulated portion only and emitting a reference signal indicative of the unmodulated portion; and control means connected to the outputs of said signal processor and reference detector means and responsive to the outputs of said signal processor and said reference detector means for generating a control signal as a function of the combined signals existing the signal processor and the reference signal.

4. A moisture-responsive control system as defined in claim 3 wherein said signal processor further includes rectifier means for converting the amplified modulated portion to an unmodulated portion.

5. A windshield wiper control assembly responsive to moisture on a vehicle windshield comprising:

emitter means for emitting electromagnetic radiation toward the windshield;

first detector means for detecting radiation as refracted by said windshield from said emitter means said first detector means also varying as it is influenced by ambient sources of energy, said first detector means producing a first signal responsive thereto;

second detector means for detecting radiation impinging directly thereon from said emitter means and also varying as it is influenced by ambient energy sources, said second detector means producing a second signal responsive thereto; and control means responsive to the first and second signals for controlling the operation of a wiper motor, said control means including a manually actuable adjustment device accessible to the vehicle operator for altering the response of said control means to at least one of said first and second signals, whereby the vehicle operator can adjust the sensitivity of said control assembly to various amounts of moisture on the windshield.

6. A windshield wiper control assembly as defined in claim 5 wherein said at least one signal includes the second signal.

7. A windshield wiper control assembly as defined in claim 5 wherein said control means further includes a switch accessible by the vehicle operator and switchable between a first state wherein the wiper motor is not responsive to said control means and a second state wherein the wiper motor is responsive to said control means.

8. A moisture-sensor assembly comprising:

first means for emitting a first signal indicative of the amount of moisture on a transparent media;

said first means being responsive to at least one ambient variable;

second means responsive to said ambient variable for emitting a reference signal indicative of how the first signal varies in response to at least said one variable; and control means for producing a control signal as a function of the first signal and reference signal, said control means including manually actuable adjustment means accessible by a human operator for changing the effect of one of the first signal and reference signal, thereby enabling the operator to adjust the sensitivity of said control means to various amounts of moisture on the transparent media.

9. A moisture-sensor assembly as defined in claim 8 wherein the one signal includes the reference signal.

10. A moisture-sensor assembly as defined in claim 8 wherein the at least one ambient variable includes at least one of ambient light, temperature, component age, and component variation.

11. A moisture sensitive control system for an automotive windshield wiper, said control system comprising:

a wiper;

motive means for driving said wiper;

a first manually actuable switch accessible by the vehicle operator and having three states, an off state indicating that said wiper should not be actuated, an intermittent state indicating that said wiper should be intermittently actuated at selected time intervals, and an on state indicating that said wiper should be continuously actuated;

moisture sensor means for providing a signal indicative of moisture on the vehicle windshield;

a second manually actuable switch accessible by the vehicle operator and having two states, an off state indicating that wiper operation in response to said moisture sensor means is not desired and an on state indicating that said wiper should be operated in response to said moisture sensor means; and control means responsive to said first and second switches and said moisture sensor means for controlling said wiper motive means, said control means:

(a) causing said motive means to remain dormant when said first switch is in the off state;

(b) operating said motive means continuously when said first switch is in the on state;

(c) operating said motive means intermittently at a selectable time interval when said first switch is in the intermittent state and said second switch is in the off state; and (d) operating said motive means in response to said moisture sensor means when said first switch is in the intermittent state and said second switch is in the on state.

12. A moisture sensitive control system as defined in claim 11 further comprising an adjustment device for altering the response of said control means to said moisture sensor means to alter the sensitivity of said system to moisture.

13. A windshield wiper system comprising:

a wiper motive means;

a first switch having three states indicating that said motive means should be turned off, operated intermittently at a time interval, or operated continuously;

moisture detector means for outputting a signal indicative of moisture on the vehicle windshield;

a second switch having two states indicating that said motive means should or should not be responsive to said detector means; and control means responsive to said first and second switches for controlling said motive means in response to said moisture detector means only when said first switch is in the state indicating intermittent operation and said second switch is in the state indicating that said motive means should be responsive to said detector means.

14. A windshield wiper system as defined in claim 13 further comprising an adjustment means for altering the response of said control means to said moisture detector means, whereby the sensitivity of said system to moisture can be adjusted using said adjustment means.

15. A windshield wiper moisture-detection system comprising:

emitter means for emitting electromagnetic radiation;

detector means for detecting the electromagnetic radiation emitted by said emitter means and refracted and reflected by a vehicle windshield;

control means responsive to said detector means for causing actuating of a vehicle windshield wiper when a preselected amount of moisture is determined to be on the windshield;

second detector means for detecting ambient light; and inhibit means responsive to said second detector means for comparing the detected level of ambient light to a preselected level of ambient light and inhibiting actuation of the vehicle wiper when said detected level of ambient light exceeds said preselected level of ambient light, whereby the likelihood that the wiper will be falsely actuated by relatively high ambient light levels alone is reduced.

16. A windshield wiper moisture detection system as defined in claim 15 wherein said control means includes means for providing a control signal indicating that a wipe is desired, and wherein said inhibit means includes means for overriding said control signal when the level of ambient light exceeds the preselected level.

17. A windshield wiper moisture detection system as defined in claim 16 wherein said overriding means comprises means for shunting the control signal to ground.

* * * * *

UNITED STATES PATENT AND TRADEMARK OFFICE
CERTIFICATE OF CORRECTION

PATENT NO. : 4,859,867

DATED : August 22, 1989

INVENTOR(S) : Mark L. Larson, Karl H. Hanft, Desmond J. O'Farrell

It is certified that error appears in the above-identified patent and that said Letters Patent is hereby corrected as shown below:

Column 1, line 17:

After "present" insert --.--.

Column 1, line 40:

"NOW" should be --now--.

Column 2, line 45:

Delete "10".

Column 5, line 30:

"S" should be --S1--.

Column 6, line 54:

After "vehicle" insert --.--.

Signed and Sealed this

Second Day of October, 1990

*Attest:*

HARRY F. MANBECK, JR.

*Attesting Officer*           *Commissioner of Patents and Trademarks*